(12) United States Patent
Lin et al.

(10) Patent No.: US 10,816,094 B2
(45) Date of Patent: Oct. 27, 2020

(54) SEALING MEMBER FOR LIQUID COMPOSITE SPRING AND LIQUID COMPOSITE SPRING

(71) Applicant: Zhuzhou Times New Material Technology Co., Ltd., Zhuzhou, Hunan (CN)

(72) Inventors: Sheng Lin, Zhuzhou (CN); Weihui Hu, Zhuzhou (CN); Zetao Su, Zhuzhou (CN); Tao Yue, Zhuzhou (CN); Pengfei Yuan, Zhuzhou (CN); Congcong Chen, Zhuzhou (CN); Zhan Pan, Zhuzhou (CN); Hui Zeng, Zhuzhou (CN)

(73) Assignee: Zhuzhou Times New Material Technology Co. Ltd., Hunan (CN)

( * ) Notice: Subject to any disclaimer, the term of this patent is extended or adjusted under 35 U.S.C. 154(b) by 11 days.

(21) Appl. No.: 16/149,870

(22) Filed: Oct. 2, 2018

(65) Prior Publication Data
US 2019/0113140 A1    Apr. 18, 2019

(30) Foreign Application Priority Data

Oct. 17, 2017  (CN) .......................... 2017 1 0961741
Oct. 17, 2017  (CN) .......................... 2017 1 0961742

(51) Int. Cl.
*F16J 15/12*   (2006.01)
*F16F 5/00*    (2006.01)
(Continued)

(52) U.S. Cl.
CPC ................ *F16J 15/121* (2013.01); *F16F 1/40* (2013.01); *F16F 5/00* (2013.01); *F16F 13/08* (2013.01);
(Continued)

(58) Field of Classification Search
CPC ........ F16J 15/121; F16J 15/022; F16J 15/104; F16F 2230/30; F16F 5/00; F16F 2236/045; F16F 2226/04
See application file for complete search history.

(56) References Cited

U.S. PATENT DOCUMENTS 5,769,402 A * 6/1998 Ide ........................ F16F 13/264
                                                       267/140.14
6,499,729 B1   12/2002 Walterbusch
(Continued)

FOREIGN PATENT DOCUMENTS

GB          2268566 A       1/1994

OTHER PUBLICATIONS

Search Report for corresponding European Application No. 18 19 8184 dated Mar. 25, 2019.

*Primary Examiner* — Xuan Lan Nguyen
(74) *Attorney, Agent, or Firm* — Harness, Dickey & Pierce, P.L.C.

(57) ABSTRACT

The spring includes an elastic member having a liquid accommodating chamber. The sealing member includes a base plate, a pressure plate, and a pressure elastic membrane provided in the liquid accommodating chamber. The pressure elastic membrane has a lip portion radially extending from an end portion of the pressure elastic membrane. The lip portion is provided with a projection. The pressure plate and the base plate define a clamping recess together. The lip portion is pressed in the clamping recess to seal the liquid accommodating chamber.

13 Claims, 5 Drawing Sheets

(51) Int. Cl.
    *F16J 15/02*       (2006.01)
    *F16J 15/10*       (2006.01)
    *F16F 1/40*        (2006.01)
    *F16F 13/08*       (2006.01)
    *F16J 15/06*       (2006.01)

(52) U.S. Cl.
    CPC ........... F16J 15/022 (2013.01); F16J 15/062 (2013.01); F16J 15/104 (2013.01); *F16F 2226/04* (2013.01); *F16F 2230/30* (2013.01); *F16F 2236/045* (2013.01)

(56) References Cited

U.S. PATENT DOCUMENTS

| | | | |
|---|---|---|---|
| 7,350,776 B2 * | 4/2008 | Muramatsu | F16F 13/105 267/140.14 |
| 7,934,709 B2 * | 5/2011 | Miyakosawa | F16F 13/103 248/631 |
| 2004/0262830 A1 * | 12/2004 | Maeno | F16F 13/101 267/140.4 |
| 2008/0308980 A1 | 12/2008 | Mitsch | |
| 2011/0221106 A1 | 9/2011 | Reinke et al. | |

* cited by examiner

SEALING MEMBER FOR LIQUID COMPOSITE SPRING AND LIQUID COMPOSITE SPRING

CROSS-REFERENCE TO RELATED APPLICATIONS

The present application claims priority under 35 U.S.C. § 119 to Chinese Patent Application Nos. 201710961741.X and 201710961742.4, both filed Oct. 17, 2017, in the Chinese Patent & Trademark Office, the entire contents of each of which are hereby incorporated by reference.

TECHNICAL FIELD

The present invention relates to the field of mechanical seals, and in particular to a sealing member for a liquid composite spring. The invention also relates to a liquid composite spring comprising such a sealing member.

TECHNICAL BACKGROUND

In recent years, clean energy, for example, wind energy as a clean and sustainable new energy source, has been intensively developed. With continuous researches on wind energy, wind power technology has been developed rapidly. As the continuous development of megawatt wind turbine generator, the load of wind turbine generator is increasing. Therefore, the damping of key components of the wind turbine generator becomes particularly important.

In the prior arts, the gearbox of the wind turbine generator is mainly supported by hydraulic means. Hydraulic supporting device is mainly used for a four-point supporting model, which is a new type of shock-absorbing support developed on the basis of traditional elastic support means. Among others, the hydraulic supporting devices are installed on the right and left sides of the gear box of the wind turbine generator, one on each side, mainly for bearing a torsional load of the gear box, and the main load-bearing member of the hydraulic supporting device is a liquid composite spring. The liquid composite spring arranged at the lower left end of the gear box is in communication with the liquid composite spring arranged at the upper right end thereof through a high-pressure hose, and the liquid composite spring arranged at the upper left end is also in communication with the liquid composite spring arranged at the lower right end through a high-pressure hose. When subjected to a torsional load, the hydraulic supporting device of this structure will exhibit a large torsional rigidity, since the two liquid composite springs for load-bearing are in communication with each other through the high-pressure hose, wherein the liquid is non-flowable. By contrast, when subjected to a vertical load, liquid in the chambers of two liquid composite springs arranged at lower ends of the gear box will flow through the high-pressure hose to the chambers of two liquid composite springs arranged at upper ends thereof, thus exhibiting a small vertical stiffness and a large damping.

After the liquid composite spring is installed, the built-in chamber thereof should be vacuumed and filled with liquid. After the chamber is filled with liquid, the liquid composite spring must be sealed. The hydraulic supporting system requires a high degree of sealing. Therefore, the design on the sealing of the liquid composite spring is particularly important.

Currently, the liquid composite springs is mainly sealed with a pressure elastic membrane. Traditional pressure elastic membrane has a lip portion that is sealed by a T-shaped sealing structure, which provides sealing effect by pressing an upper pressure plate onto a base plate. This structure is relatively simple, but can form limited sealing points. During operation, a relatively large pulling force will be generated at a location where the pressure elastic membrane is sealingly connected with the pressure plate, since the volume of the pressure elastic membrane becomes large, so that the lip portion of the pressure elastic membrane will be loosened or even pulled out. This will result in poor sealing performance, which affects the stiffness performance of the gearbox of the wind turbine generator.

In addition, wind power plants are usually established at remote locations, and the wind turbine generator always operates high above the ground, so that the maintenance and repair thereof are inconvenient and expensive.

SUMMARY OF THE INVENTION

Aiming to solve at least some of the technical problems described above, the present invention proposes a sealing member for liquid composite spring. The sealing member is capable of forming a self-sealing structure having good sealing properties, and in the meantime preventing sealing points from being pulled to render the sealing out of function.

To this end, according to a first aspect of the present invention, a sealing member for a liquid composite spring is provided. The liquid composite spring includes an elastic member having a liquid accommodating chamber. The sealing member comprises: a base plate; a pressure plate arranged on the base plate; and a pressure elastic membrane provided in the liquid accommodating chamber, the pressure elastic membrane having a lip portion radially extending from an end portion of the pressure elastic membrane. The lip portion is provided with a projection. The pressure plate and the base plate define a clamping recess together, wherein the lip portion is pressed in the clamping recess to seal the liquid accommodating chamber.

In a preferred embodiment, the projection is provided on each of two surfaces of the lip portion, and has a cross section shaped as a triangle.

In a preferred embodiment, the triangle is a right-angled triangle, including an oblique side facing radially inward while a right-angled side facing radially outward.

In a preferred embodiment, the oblique sides of two projections form an apex angle, which is in a range of 60 to 150 degrees before the pressure plate is pressed onto the base plate and in a range of 30 to 120 degrees thereafter.

In a preferred embodiment, the projection is provided on each of two surfaces of the lip portion, and has a cross section shaped as a rectangle, a circular arc, or a wave.

In a preferred embodiment, the lip portion terminates at the projection in a radial direction.

In a preferred embodiment, the pressure plate and the lip portion form a first sealing point at a position radially inside of the projection after the pressure plate is pressed onto the base plate.

In a preferred embodiment, the lip portion further includes a lip rim located radially outside of the projection, wherein the lip rim includes a flat surface in contact with the base plate and a curved surface in contact with the pressure plate, and the pressure plate is provided with a receiving groove for the curved surface.

In a preferred embodiment, the pressure plate and the lip portion form a second sealing point at a position radially outside of the projection after the pressure plate is pressed onto the base plate.

In a preferred embodiment, a reinforcing element is arranged in the projection.

In a preferred embodiment, the reinforcing element is formed as a steel ring, which has a cross section adapted to a cross section of the projection.

In a preferred embodiment, a maximum thickness of the steel ring is larger than a size of an opening formed when the pressure plate is pressed onto the base plate.

In a preferred embodiment, the steel ring has a cross section of a trapezoid, which has an upper base oriented radially inward and a lower base oriented radially outward.

In a preferred embodiment, the reinforcing element has a cross section in shape of a circle or a rectangle.

In a preferred embodiment, the lip rim is provided with a reinforcing element therein.

According to a second aspect of the present invention, a liquid composite spring is provided. The liquid composite spring comprises a liquid composite spring body, and a sealing member as mentioned above located at a bottom of the liquid composite spring body.

BRIEF DESCRIPTION OF THE DRAWINGS

The invention will now be described with reference to the accompanying drawings.

In the present application, all the drawings are schematic views for illustrating the principle of the present invention only. These drawings are not drawn to real scale.

DETAILED DESCRIPTION OF THE EMBODIMENTS

The invention is described below with reference to the drawings.

Figure 1:
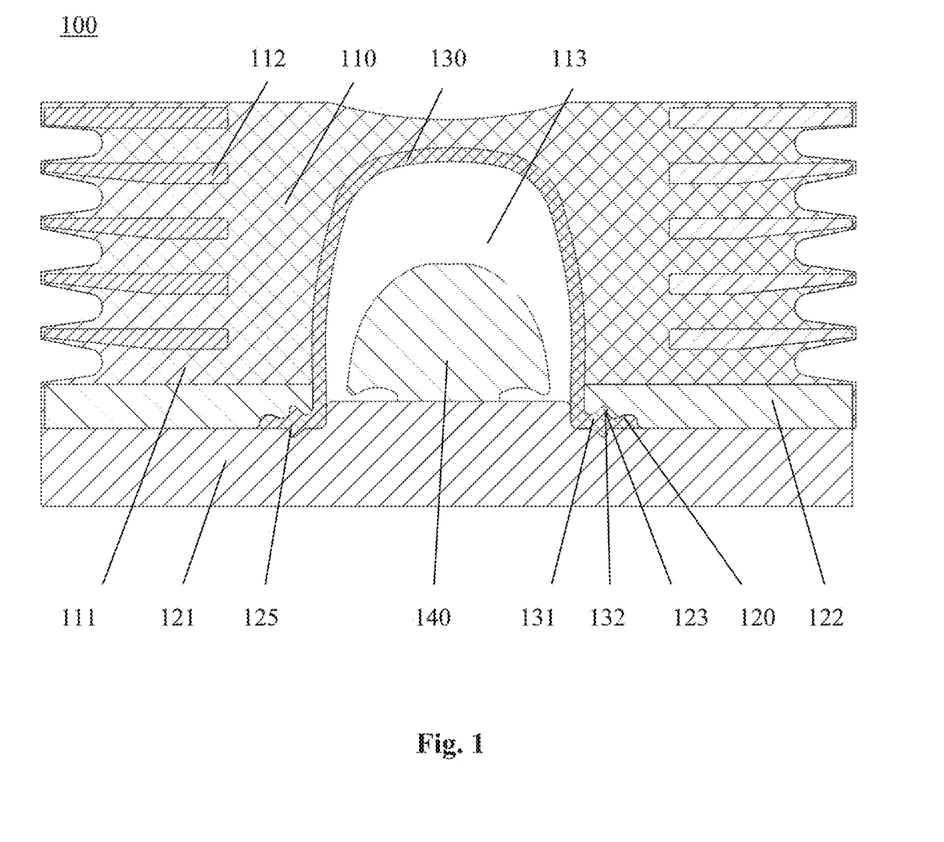
FIG. 1 shows the structure of a liquid composite spring according to the invention, which comprises a sealing member according to the invention.

FIG. 1 shows a liquid composite spring 100 according to the invention, comprising a sealing member 120 of the present invention. As shown in FIG. 1, the liquid composite spring 100 includes a resilient member 110, which includes a rubber body 111 having a cylindrical structure, and one end surface (for example, a lower end surface as shown in the drawing) of the rubber body 111 is provided with a liquid accommodating chamber 113. A plurality of steel plates 112 as reinforcing elements are arranged in the rubber body 111. Each steel plate 112 may be, for example, in the shape of a circular disc, and is integrally formed with the rubber body by vulcanization. The above structure of the elastic member 110 of the liquid composite spring 100 is well known in the art, and a detailed description thereof will be omitted herein.

The sealing member 120 according to the present invention is disposed at a bottom of the liquid composite spring 100, and includes a pressure elastic membrane 130 disposed in the liquid accommodating chamber 113. The outer shape of the pressure elastic membrane 130 is adapted to the structure of the liquid accommodating chamber, such that the outer surface of the pressure elastic membrane 130 is fitted to the inner wall of the liquid accommodating chamber 113. At the end of the pressure elastic membrane 130, a lip portion 131 projecting outwardly along a radial direction is provided. The lip portion 131 generally forms an L-shaped structure. A projection 132 is provided on the lip portion 131. In the present invention, the term "radial direction" indicates the horizontal direction in FIG. 1.

In addition, the sealing member 120 further includes a base plate 121 arranged at a lower end of the elastic member and a pressure plate 122 disposed on the base plate 121. The pressure plate 122 is located beneath the rubber body 111, and formed into one piece with the rubber body 111 through vulcanization. The base plate 121 and the elastic member 110 are coupled together by a mounting screw not shown. The base plate 121 and the pressure plate 122 are provided with respective grooves 125 that are opposite to each other along the radial direction. After the pressure plate 122 is pressed onto the base plate 121, the groove 125 of the base plate 121 and that of the groove 125 together define a clamping recess 123. The lip portion 131 of the pressure elastic membrane 130 is then pressed between the base plate 121 and the pressure plate 122, with the projection 132 of the lip portion 131 being press-fitted in the clamping recess 123, thereby forming a sealing to the liquid accommodating chamber 113.

Moreover, a stop limit 140 is provided in the liquid accommodating chamber 113, and preferably located at a central position of the base plate 121. The stop limit 140 is mounted on the base plate 121 by a connecting stud (not shown), so as to limit the position of the rubber body 111.

Figure 2:
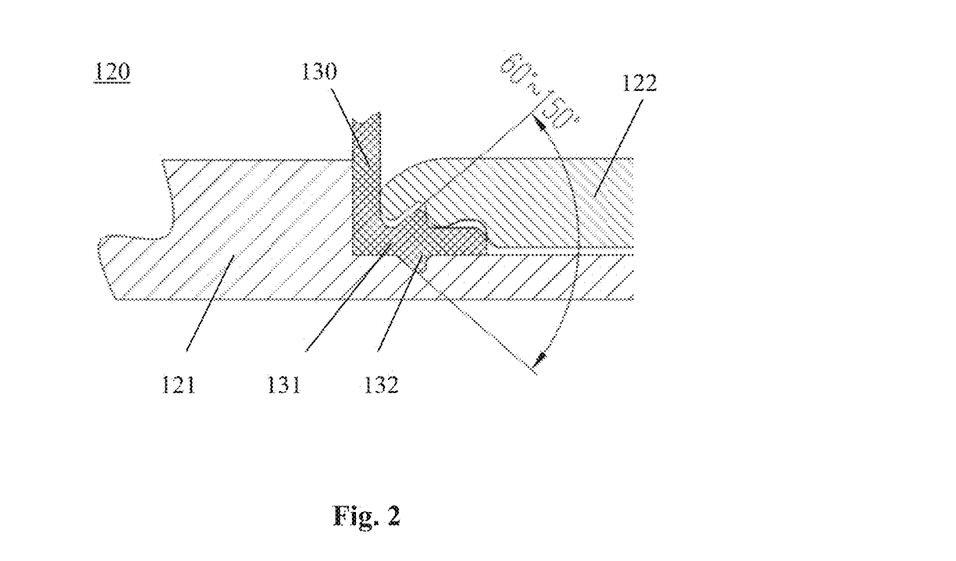
FIG. 2 shows a lip portion of the sealing member of FIG. 1 in a state before being pressed.

FIG. 2 shows the lip portion 131 of the seal 120 in a state before being pressed. As shown in FIG. 2, two projections 132 are symmetrically provided on two respective surfaces of the lip portion 131 of the pressure elastic membrane 130. The projection 132 may have a cross section shaped as a triangle. However, it would be understood that the projection 132 could also have a cross section of other shapes, such as a rectangle, a circular arc, or a wave. For example, in the embodiment as shown, the cross-sectional shape of the projection 132 is a right-angled triangle, which has an oblique side facing the radially inner side and a right-angled side facing the radially outer side. Thus, two right-angled triangles of the two projections 132 together form an isosceles triangle, wherein the oblique sides of two projections 132 constitute the waists of the isosceles triangle, and the bottom edge of the isosceles triangle is perpendicular to the radial direction of the lip portion 131. Prior to pressing, the apex angle of the isosceles triangle is in a range of 60 to 150 degrees.

Figure 3:
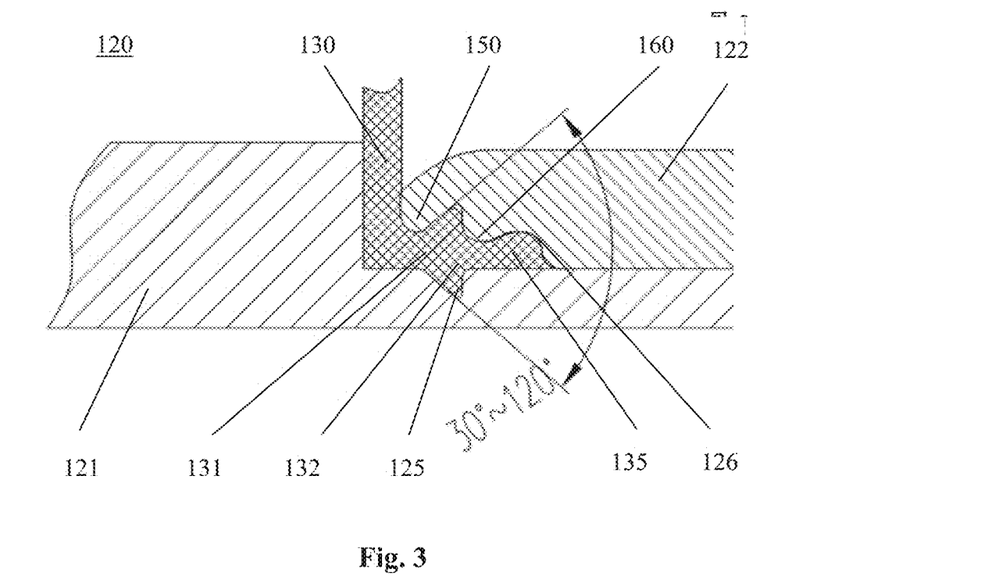
FIG. 3 shows the lip portion of the sealing member of FIG. 1 in a state after being pressed.

FIG. 3 shows the lip portion 131 of the seal 120 in a state after being pressed. As shown in FIG. 3, after the pressure plate 122 is pressed onto the base plate 121, the projection 132 is compressed by the base plate 121 and the pressure plate 122 into the clamping recess 123, so that the apex angle of the isosceles triangle formed by the lip portion 131 is in a range of 30 to 120 degrees.

In the embodiment shown in FIG. 3, the lip portion 131 further includes a lip rim 135 located radially outside of the projection 132. The lip rim 135 includes a flat surface in contact with the base plate 121 and a curved surface in contact with the pressure plate 122. In addition, a receiving groove 126 for pressing the curved surface of the lip 135 is provided on the pressure plate 122 at a position radially outside of the groove 125. After the press-fitting, the pressure plate 122 and the lip rim 135 form a first sealing point 150 at a position radially inside of the projection 132, and a second sealing point 160 at a position radially outside of the projection 132, thereby achieving effective sealing for the liquid receiving chamber 113.

When the liquid composite spring 100 is in operation, liquid in the pressure elastic membrane 130 will be compressed to force the top of the pressure elastic membrane 130 to be stretched upwardly, thereby generating a pulling-out force at the lip portion 131. In the present embodiment, the base plate 121 and the pressure plate 122 jointly press the lip portion 131, and at the same time press the projection 132 into the clamping recess 123. Thus, when the lip portion 131 is subjected to the pulling-out force, the triangular projection 132 will firmly abut against the triangular taper recess formed by the pressure plate 122 and the base plate 121 that are pressed toward each other, thereby forming a self-sealing structure. Moreover, for this self-sealing structure, the greater the pulling-out force it receives, the more reliable the sealing effect generated is. Thus, the sealing member 120 according to the present invention can effectively prevent the sealing failure generated from the destroyed sealing point, so that the liquid composite spring 100 exhibits a good sealing performance.

Figure 4:
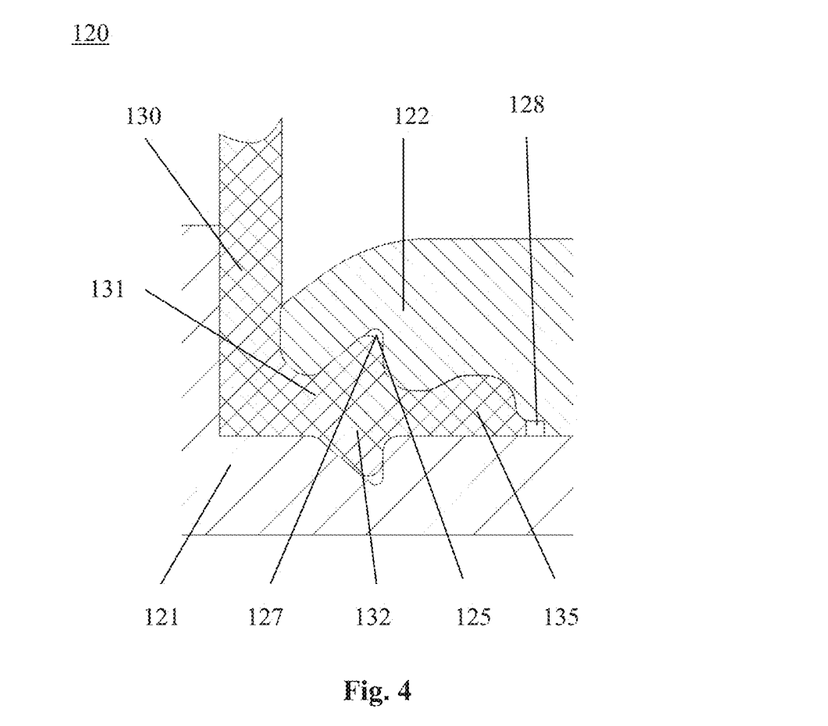
FIG. 4 shows the structure of an annular mouth end arranged at a tail end of the lip portion of the sealing member of FIG. 1.

In the present embodiment, as shown in FIG. 4, an annular mouth end 127 is provided at the bottom of each of the clamping recesses 125 of the base plate 121 and the pressure plate 122. The cross-sectional shape of the annular mouth end 127 is formed as, for example, a circular arc. In this case, the free end of each projection 132 of the lip portion 131 is provided with a rounded corner. Preferably, the corner radius of the free end of the projection 132 is greater than the corner radius of the annular mouth end 127. In this manner, when the pressure elastic membrane 130 is pressed, the lip portion 131 will be sufficiently squeezed into the annular mouth end 127 due to compression deformation, thereby ensuring a close fit between the pressure plate 122 and the base plate 121.

According to the present invention, in the embodiment as shown in FIG. 4, an annular mouth end 128 having a rectangular cross section may be further arranged radially outside of the lip rim 135. The height of the annular mouth end 128 may be in a range of one quarter to one third of the height of the lip rim 135. Similarly, when the pressure elastic membrane 130 is pressed, the lip rim 135 will be sufficiently squeezed into the annular mouth end 128 due to compression deformation, thereby ensuring a close fit between the pressure plate 122 and the base plate 121.

Figure 5:
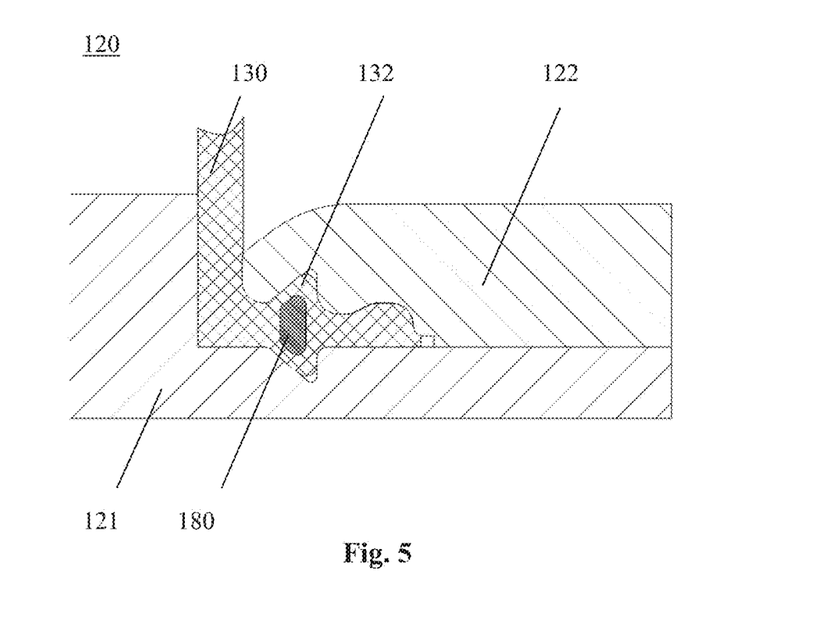
FIG. 5 shows the structure of the lip portion in which a steel ring is embedded.

Further, in order to improve the pulling-out resistance of the lip portion 131 and the sealing performance of the lip portion 131, a reinforcing element may be embedded inside the lip portion 131 according to a preferred embodiment of the present invention. As shown in FIG. 5, the reinforcing element is formed as a steel ring 180. The steel ring 180 is arranged inside the projection 132, and has a cross-sectional shape which matches the cross-sectional shape of the projection 132. In addition, the maximum thickness of the steel ring 180 is preferably selected to be larger than the size of an opening formed when the pressure plate 122 and the base plate 121 are pressed together, so as to further improve the pulling-out resistance of the lip portion 131. In the illustrated embodiment, the cross-sectional shape of the steel ring 180 is substantially formed as an isosceles trapezoid, which has an upper base oriented radially inward and a lower base oriented radially outward. This shape can be well adapted to the shape of the projection 132 to maximize the reinforcement of the steel ring 180.

Figure 6:
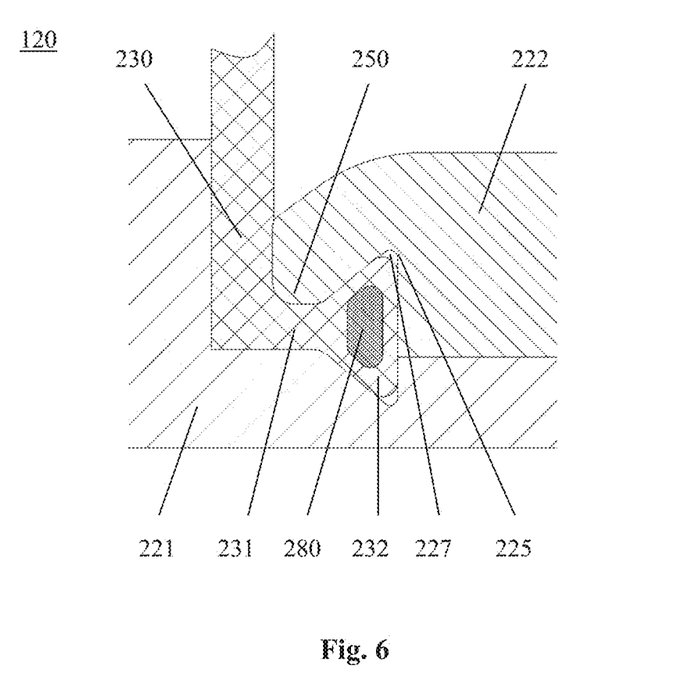
FIG. 6 shows the structure of another lip portion of the sealing member of FIG. 1.

As shown in FIG. 6, in one embodiment, the lip portion 231 is configured to terminate at the projection 232 along the radial direction. Thus, the free end of the lip portion 231 is configured as the projection 232 having a triangular cross section. The triangular projection 232 is formed as an isosceles triangle, which has a center line that is the radial center line of the lip portion 231, and a bottom side located at the radially outer end of the lip portion 231 and perpendicular to the base plate 221. Again, the apex angle of the isosceles triangle is in a range of 60 to 150 degrees before the pressing fit, and is in a range of 30 to 120 degrees after the pressing fit. Similarly, a steel ring 280 may be also embedded in the isosceles triangular region. In the illustrated embodiment, the cross-sectional shape of the steel ring 280 is substantially formed as an isosceles trapezoid, which has an upper bottom edge oriented radially inward and a lower base oriented radially outward. Thus, after the pressure plate 221 and the lip portion 231 are pressed together, a first sealing point 250 is formed radially inside of the projection 232. With this structure, effective sealing effect of the liquid accommodating chamber 113 can be also achieved.

Further, in the present embodiment, as shown in FIG. 6, an annular mouth end 227 is provided at the bottom of each of the clamping recesses 225 of the base plate 221 and the pressure plate 222. The cross-sectional shape of the annular mouth end 227 is formed as, for example, a circular arc. In this case, the free end of each projection 232 of the lip portion 231 is provided with a rounded corner. Preferably, the corner radius of the free end of the projection 232 is greater than the corner radius of the annular mouth end 227. In this manner, when the pressure elastic membrane 230 is pressed, the lip portion 231 will be sufficiently squeezed into the annular mouth end 227 due to compression deformation, thereby ensuring a close fit between the pressure plate 222 and the base plate 221.

Figure 7:
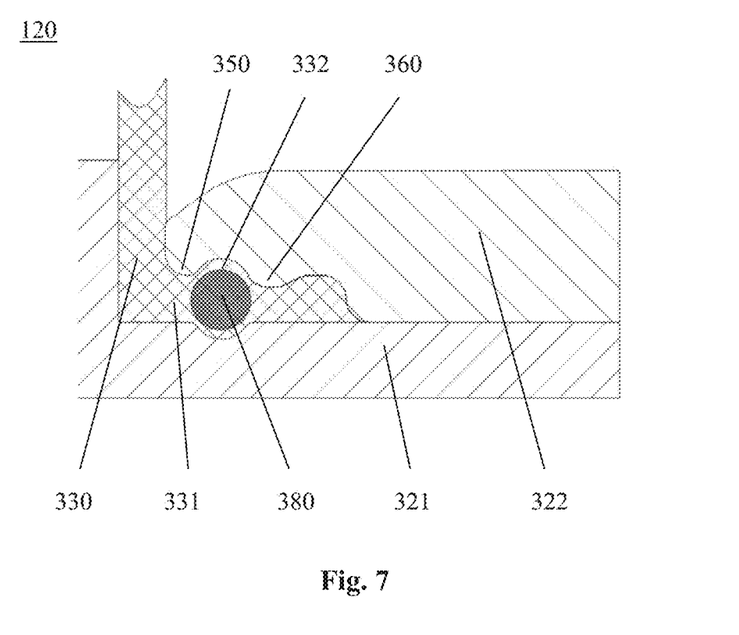
FIG. 7 shows the structure of the lip portion in which another steel ring is embedded.

As shown in FIG. 7, in one embodiment, the cross-sectional shape of the projection 332 of the lip portion 331 is formed as a circular arc. In this case, the cross section of the steel ring 380 disposed inside the projection 332 is formed as a circle that is adapted to the cross section of the projection 332. The diameter of the circle is preferably selected to be larger than the size of an opening formed when the pressure plate 322 and the base plate 321 are pressed together, so as to further improve the pulling-out resistance of the lip portion 331. After the pressure plate 321 and the lip portion 331 are pressed together, a first sealing point 350 is formed radially inside of the projection 332, and a second sealing point 360 is formed radially outside of the projection 332, thereby achieving effective sealing performance t of the liquid receiving chamber 113.

In an embodiment not shown, the lip portion 331 can be provided with a plurality of projections 332, each of which is embedded with a steel ring 380 therein. This structure can, on the one hand, increase the number of sealing points, and on the other hand improves the rigidity of the lip portion 331, thus greatly increasing the pulling-out resistance of the pressure elastic membrane 330.

Figure 8:
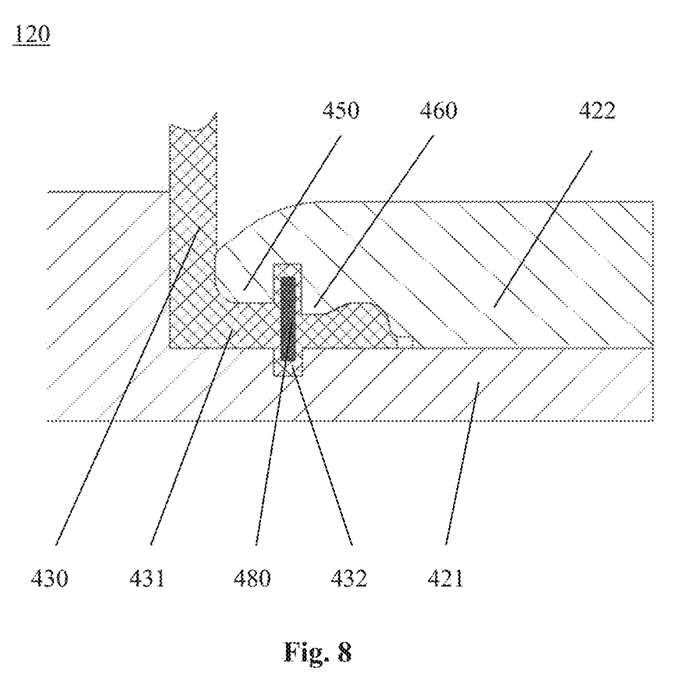
FIG. 8 shows the structure of the lip portion in which still another steel ring is embedded.

As shown in FIG. 8, in one embodiment, the cross-sectional shape of the projection 432 of the lip portion 431 is formed as a rectangle. In this case, the cross section of the steel ring 480 disposed inside the projection 432 is formed as a rectangle that is adapted to the cross section of the projection 432, with the long side of the rectangle being oriented along the radial direction perpendicular to the lip portion 431. In addition, the long side of the rectangle is preferably selected to be larger than the size of an opening formed when the pressure plate 422 and the base plate 421 are pressed together, so as to further improve the pulling-out resistance of the lip portion 431. After the pressure plate 421 and the lip portion 431 are pressed together, a first sealing point 450 is formed radially inside of the projection 432, and a second sealing point 460 is formed radially outside of the projection 432, thereby achieving effective sealing performance of the liquid receiving chamber 113.

According to the present invention, the pressure elastic membrane 130 may be made of rubber material. The compression ratio of the lip portion 131 of the pressure elastic membrane 130 is set in a range of 15% to 40%. By means of which, not only the toughness and the pulling-out resistance of the lip portion 131 but also the rigidity of the lip portion 131 can be ensured. Therefore, the sealing performance of the liquid accommodating chamber 113 can be secured.

The term "steel ring" as used in this context is merely a term used for the convenience of description, and other ring-like or ring-shaped elements made of other materials may be also used.

Although the present invention has been described with reference to preferred embodiments, various modifications and variants to the present invention may be made by anyone skilled in the art, without departing from the scope and spirit of the present invention. In particular, as long as there is no structural conflict, the respective technical features mentioned in various embodiments may be combined with one another in any manner. The present invention is not limited to the specific embodiments disclosed herein, but rather includes all the technical solutions falling within the scope of the claims.

The invention claimed is:

1. A sealing member for a liquid composite spring, which includes an elastic member having a liquid accommodating chamber, the sealing member comprising:
   a base plate;
   a pressure plate arranged on the base plate; and
   a pressure elastic membrane provided in the liquid accommodating chamber, the pressure elastic membrane having a lip portion radially extending from an end portion of the pressure elastic membrane,
   wherein the lip portion is provided with a projection, and the pressure plate and the base plate define a clamping recess together, wherein the lip portion is pressed in the clamping recess to seal the liquid accommodating chamber,
   wherein a reinforcing element is arranged in the projection,
   wherein the reinforcing element is formed as a steel ring, which has a cross section adapted to a cross section of the projection, and
   wherein a maximum thickness of the steel ring is larger than a size of an opening formed when the pressure plate is pressed onto the base plate.

2. The sealing member according to claim 1, wherein the projection is provided on each of two surfaces of the lip portion, and has a cross section shaped as a triangle.

3. The sealing member according to claim 2, wherein the triangle is a right-angled triangle, including an oblique side facing radially inward while a right-angled side facing radially outward.

4. The sealing member according to claim 3, wherein the oblique sides of two projections form an apex angle, which is in a range of 60 to 150 degrees before the pressure plate is pressed onto the base plate and in a range of 30 to 120 degrees thereafter.

5. The sealing member according to claim 1, wherein the projection is provided on each of two surfaces of the lip portion, and has a cross section shaped as a rectangle, a circular arc, or a wave.

6. The sealing member according to claim 1, wherein the lip portion terminates at the projection in a radial direction.

7. The sealing member according to claim 1, wherein the pressure plate and the lip portion form a first sealing point at a position radially inside of the projection after the pressure plate is pressed onto the base plate.

8. The sealing member according to claim 1, wherein the lip portion further includes a lip rim located radially outside of the projection, wherein the lip rim includes a flat surface in contact with the base plate and a curved surface in contact with the pressure plate, and the pressure plate is provided with a receiving groove for the curved surface.

9. The sealing member according to claim 8, wherein the pressure plate and the lip portion form a second sealing point at a position radially outside of the projection after the pressure plate is pressed onto the base plate.

10. The sealing member according to claim 1, wherein the steel ring has a cross section of a trapezoid, which has an upper base oriented radially inward and a lower base oriented radially outward.

11. The sealing member according to claim 1, wherein the reinforcing element has a cross section in shape of a circle or a rectangle.

12. The sealing member according to claim 8, wherein the lip rim is provided with the reinforcing element therein.

13. A liquid composite spring, comprising:
a liquid composite spring body; and
the sealing member according to claim 1 located at a bottom of the liquid composite spring body.

* * * * *